Aug. 16, 1949.  E. BERGH  2,479,534
BEET SEED PLANTER
Filed June 19, 1946
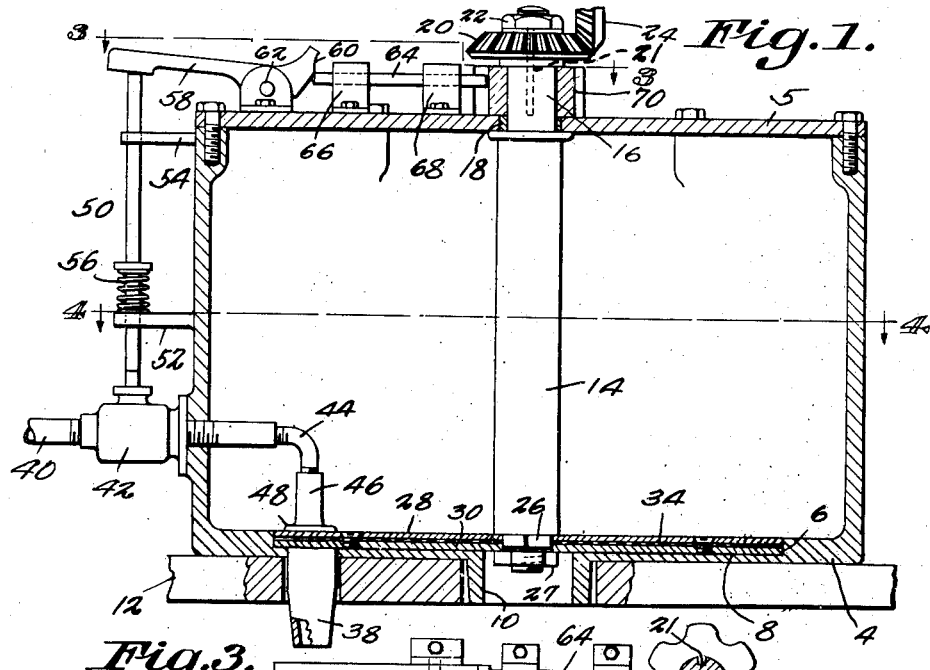
E. Bergh
INVENTOR.
BY A. Knowles
ATTORNEYS.

Patented Aug. 16, 1949

2,479,534

UNITED STATES PATENT OFFICE 2,479,534

BEET SEED PLANTER

Elmer Bergh, Harlem, Mont.

Application June 19, 1946, Serial No. 677,791

4 Claims. (Cl. 222—9)

My present invention relates to an improved beet seed planter of the type particularly adapted to discharge from a hopper containing the beet seeds a single seed at a time and the discharge means comprises a novel and unique arrangement of parts whereby a blast of compressed air will force through a discharge disk a single beet seed as the vehicle upon which the hopper is carried progresses along the prepared row.

In the accompanying drawings I have illustrated one complete example of the physical embodiment of my invention according to the best mode I have thus far devised but it will be understood that various changes and alterations may be made in the exemplified structure within the scope of the appended claims.

In the drawings—

Figure 1 is a vertical sectional view of the seed hopper of my invention showing the discharge plate and the pressure means for forcing a seed through the plate.

Figure 2 is a horizontal sectional view thereof taken at line 2—2 of Figure 1.

Figure 3 is a top plan view of the air valve actuating mechanism; and

Figure 4 is an enlarged detail view of a portion of the discharge plate and the air line terminal aligned with the outlet tube.

Referring now to the drawings wherein like characters indicate like parts I have illustrated the structural embodiment of my invention comprising a cylinder 2 having a bottom 4 and top 5 and suitably mounted on the frame member 12 of the planter.

The bottom 4 of the cylinder is formed with an annular shoulder 6 creating a circular depression 8 and a collar 10 depends from the bottom of the cylinder into a suitable opening in the frame 12.

A central shaft 14 is fashioned with a stub 16 journaled as at 18 in the top of the cylinder and a gear 20 keyed to the shaft as at 21 and secured thereon by nut 22 engages a gear 24 from a suitable power source on the planting vehicle.

The lower end of the shaft 14 is squared as at 26 and a nut 27 is provided to secure on the squared shaft end the seed selecting disk comprising the spaced metal disks 28 and 30 having aligned openings 32 and between these spaced disks I employ a rubber disk 34 the periphery of which terminates at approximately the center of the openings 32.

It will be apparent that as the hopper is filled with the desired amount of beet seed covering the disk, the disk in its rotation with the shaft 14 as the vehicle moves down the row will carry one beet seed S in each of the openings 32 and the rubber disk 34 will prevent the seed from passing therethrough until additional pressure is applied.

A suitable source of such necessary pressure is illustrated as including the compressed air line 40 in which is located the valve 42 and the line 44 from the valve is connected with a terminal 46 flanged as at 48 and so positioned that the circular row of openings 32 will successively pass therebelow. A blast of compressed air will thus force the beet seed S past the rubber disk periphery into the discharge tube 38, and into the row prepared to receive the seed.

In order to control the compressed air blast and to permit the exhaust of the blast as the openings 32 successively pass below the terminal, I utilize a valve stem 50 for the valve 42 slidably mounted in the guides 52 and 54 and urged into valve contact by the spring 56. On the top 5 of the cylinder 4 I have mounted a rocker arm 58 having a cam face 60 and pivotally secured as at 62.

A push rod 64 is slidably supported in the guides 66 and 68 and this push rod engages the cam face 60 of the rocker arm at one end and the other end of the rod engages the cam wheel 70 keyed to the stub shaft 16 for rotation therewith.

The cam wheel is fashioned with a series of cam faces equal to the number of openings in the discharge disk and as the disk and shaft rotate under power from the gears, the valve will be actuated by the mechanical linkage with the presentation of the cam faces on the cam wheel as each opening passes under the air line terminal.

Oviously the compressed air blast will be sufficient in power to force the seed S past the protruding periphery of the rubber disk but will not be sufficient to make the seed bounce out of the row into which it is dropped. The rubber disk being resilient and covering just enough of the opening to retain the seed will give under the pressure of a relatively soft air blast and the seed will be permitted to drop through the discharge tube 38 into the shallow row normally employed in planting beet seeds.

Having thus fully described my invention, what I claim as new and desire to secure by Letters Patent is:

1. In a beet seed planter, the combination with a hopper and discharge tube, of spaced rotary disks having a series of aligned seed openings therethrough operating between the hopper and discharge tube, a resilient disk between the said spaced disks the periphery of which terminates centrally of the openings to normally retain seed in the openings, and fluid pressure means for forcing the seed past the periphery of the resilient disk, through the discharge tube.

2. In a beet seed planter, the combination with a hopper having a discharge tube, of spaced rotary disks having a series of aligned seed openings therethrough aligning with the discharge tube as the disks rotate, a resilient disk secured between the spaced disks the periphery of which terminates centrally of the openings to normally retain seed in the openings, means for exhausting a blast of compressed air over the seed in the openings, and means for timing the air blast to coincide with the passage of a seed opening under the air blast means, and over the discharge tube.

3. In a beet seed planter, the combination with a hopper, of a central powered shaft in the hopper, spaced rotary disks operably secured to the shaft and having a series of aligned seed openings therethrough, a resilient disk secured between the spaced disks the periphery of which protrudes partially through the said openings to normally retain seed therein, a valved air line having discharge means under which the openings pass as the disks rotate, and means on the shaft and operably connected with the valve to actuate the valve co-incidentally with the passage of an opening under the air discharge means.

4. In a beet seed planter, the combination with a hopper, of a central powered shaft in the hopper, spaced rotary disks operably secured to the shaft and having a series of aligned seed openings radially equidistant of the axis of rotation of the rotary disks, a resilient disk secured between the spaced disks to rotate therewith the periphery of which protrudes partially into said openings to temporarily retain seed therein, a valved air line having discharge means under which the series of openings passes in its rotation, a cam wheel on the shaft, a push rod reciprocated by the cam wheel to successively actuate the valve co-incidentally with the passage of an opening under the air discharge means, forcing seed from the openings of the disks.

ELMER BERGH.

REFERENCES CITED

The following references are of record in the file of this patent:

UNITED STATES PATENTS

| Number | Name | Date |
| --- | --- | --- |
| 1,169,636 | Grinstead | Jan. 25, 1916 |
| 2,198,137 | Suppiger | Apr. 23, 1940 |
| 2,302,499 | Lacson | Nov. 17, 1942 |

FOREIGN PATENTS

| Number | Country | Date |
| --- | --- | --- |
| 194,146 | Germany | Jan. 13, 1908 |
| 453,651 | France | June 13, 1913 |